May 7, 1940.   O. J. NORTON ET AL   2,199,893
CENTERING APPARATUS
Filed Jan. 26, 1939

Inventors
W. L. Norton.
O. J. Norton.
By Lacey & Lacey,
Attorneys

Patented May 7, 1940

2,199,893

UNITED STATES PATENT OFFICE 2,199,893

CENTERING APPARATUS

Oscar J. Norton and Willie L. Norton, Danville, Va.

Application January 26, 1939, Serial No. 253,008

6 Claims. (Cl. 74—241)

This invention relates to improved centering apparatus.

In many instances where pulleys or rolls, with endless belts, aprons or the like thereon, are used, it is not practicable to crown the pulleys or rolls for keeping a belt in proper position. Therefore, said belt often slips sideways on the pulleys, sometimes to the extent that disengagement of the said belt from the pulleys or rolls will take place, unless one of the pulleys or rolls is canted or skewed from its position parallel with its associated roll, in which event the canted roll will have to be readjusted repeatedly to prevent the belt from being driven off.

One object of the invention is, therefore, to provide improved centering apparatus which will effectively prevent an endless belt, apron, blanket or the like from slipping laterally on a roll or pulley.

Another object of the invention is to provide centering apparatus wherein means are employed for effecting a centering operation automatically upon lateral slipping movement of the belt.

A further object of the invention is to provide apparatus of this nature which will be characterized by the utmost simplicity.

Other and incidental objects of the invention will appear as the description proceeds.

Figures 1, 2:
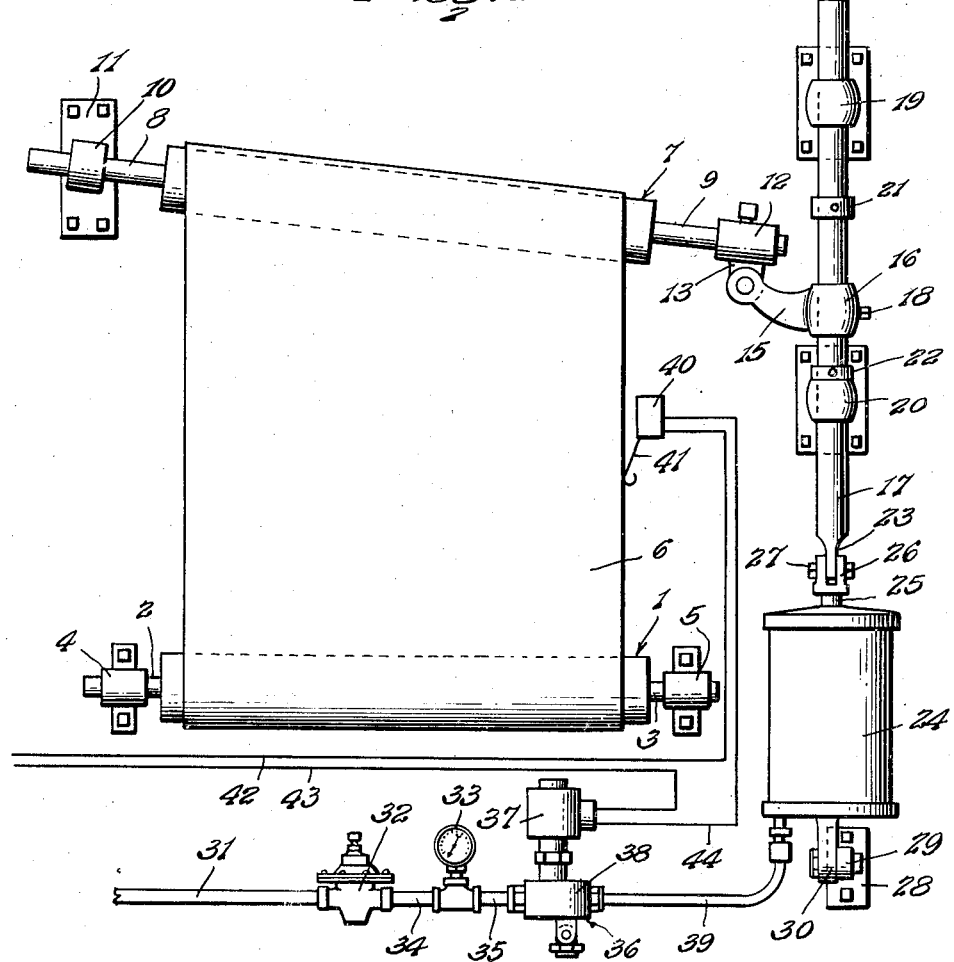
Figure 1 is a plan view of our apparatus.
Figure 2 is a detail side elevation of the operating cylinder employed.

Referring now more particularly to the drawing, wherein like reference numerals will be seen to designate like parts throughout the several views, the numeral 1 indicates a roll which may be of any desired length or diameter. The roll has trunnions 2 and 3 which are journaled in fixed bearings 4 and 5. The roll 1 has trained thereabout a portion of an endless belt 6, which is also trained about a roll 7. The roll 7 has trunnions 8 and 9. The trunnion 8 is rotatably mounted in a bearing 10, which bearing 10 is pivotally mounted on a bearing plate 11.

It should be understood that the bearings 4 and 5 and the plate 11 may be mounted in any desired location so long as the belt 6 is permitted to travel freely.

The trunnion 9 is rotatably mounted in a sleeve 12. The sleeve 12 has a lug 13 which is pivotally mounted between the arms of a yoke 14. The yoke 14 is formed on the end of a bracket 15 which terminates at its inner end in a sleeve 16. The sleeve 16 receives therethrough the central portion of an actuating rod 17, said sleeve being held fixedly on said rod by means of a set screw 18. The rod is movable in vertically disposed bearings 19 and 20 and is held against too great movement in either direction by stop sleeves 21 and 22. As shown at 23, the lower end of the actuating rod is flattened.

At 24 is shown a jack cylinder which is provided with a piston rod 25 having a yoke 26 thereon, which yoke receives between its arms the flattened portion 23 of the actuating rod 17. A bolt 27 pivotally connects the rod with the yoke. A bracket 28 is mounted below the cylinder 24 and has a projecting lug 29 to which is bolted a lug 30 carried at the lower end of the cylinder.

At 31 there is shown a pipe which leads to a source of fluid pressure. It should be understood that either compressed air, steam or liquid may be employed for operating the invention. The pipe 31 is connected to a control valve 32 and said control valve is connected to a pressure gage 33 by means of a pipe 34. A pipe 35 connects the gage 33 with a solenoid operated regulating valve shown generally at 36. The valve 36 includes a solenoid 37 and a valve casing 38. Connecting the regulating valve 36 with the lower end of the jack cylinder 24 is a flexible tube 39.

At 40, there is shown a switch which has a lever 41 which is at all times in contact with the endless belt or apron 6. The numerals 42 and 43 indicate conductors from a source of electric current. The conductor 42 is connected to one terminal from the switch 40 and the conductor 43 is connected to one terminal of the solenoid 37, the other terminal of the solenoid 37 being connected to the switch 40 by means of a conductor 44.

The operation of the invention is as follows: As the rolls 1 and 7 rotate, they carry the endless belt or apron 6 thereabout. So long as the belt 6 continues to run about the rolls 1 and 7 without lateral movement, our invention will remain inoperative. Should the apron begin to move laterally on the rolls, the lever 41 will be shifted for closing the switch 40. Electric current will be conducted through the conductors 42, 43 and 44 to the solenoid 37 which will operate for opening the regulating valve 38. Fluid will then pass into the jack cylinder 24 for urging the piston rod 25 and the rod 17 connected therewith upwardly. This will, of course, occasion upward movement of the bracket 15 with the sleeve 12 thereon and said upward movement will cause the belt to move laterally back to its normal operative position. As soon as this takes place, the lever 41 will be released and the switch 40 will be opened. The electric circuit to the solenoid 37 will be broken and said solenoid will then allow the valve 38 to return to closed position. The cylinder 24 will, of course, then become inoperative.

It will now be understood, it is believed, that we have invented improved centering apparatus which will effectively and automatically retain an endless belt in centered position on rolls about which it is trained.

Having thus described the invention, what is claimed as new is:

1. In centering apparatus, the combination with a roll having a belt trained thereabout, said roll being pivotally mounted at one end, a sleeve carried at the other end of the roll, a bracket supporting the sleeve, a rod extending through the bracket and being fixedly engaged therewith, a jack cylinder having a piston rod connected with the rod, a fluid source for the jack cylinder, and electrically operated means controlled by abnormal shifting of the belt for controlling the fluid flow to the jack cylinder whereby shifting of the rod and bracket will take place for shifting the roll and urging the belt back to normal position.

2. In centering apparatus, in combination with rolls having a belt trained thereabout, one of said rolls being pivoted, an actuating rod connected with the said pivoted roll, a jack cylinder having a piston for operating the actuating rod, fluid connections for the jack cylinder, electrically operable regulating means for regulating the fluid input to the jack cylinder, and means for controlling current flow to the regulating means upon displacement of the belt laterally on the rolls whereby said jack cylinder piston will be operated for shifting the actuating rod and roll and returning the belt to normal position.

3. In centering apparatus, in combination with a roll having a belt trained thereabout, said roll being pivoted, an actuating rod, means connecting the actuating rod with the roll, a jack cylinder having a piston rod connected with the actuating rod, a source of fluid pressure, a regulating valve connected therewith, a solenoid for operating the valve, and a switch electrically connected with the solenoid and a current source and having a lever engageable with the belt and shiftable by said belt at displacement thereof for controlling opening of the regulating valve and admission of fluid to the jack cylinder for shifting the piston rod, actuating rod and roll and returning the belt to operative position.

4. In centering apparatus, a roll, means rotatably mounting the roll, a second roll, means pivotally mounting said second roll at one end, an endless belt trained about the rolls, a bracket carried by the other end of said second roll, an actuating rod associated with the bracket, means mounting the actuating rod for sliding movement, a jack cylinder having a piston rod connected with the actuating rod, a fluid source, a regulating valve connected between the fluid source and the jack cylinder and being solenoid operated, a switch having a lever engageable with the belt, and circuit connections between the solenoid, the switch and a current source, said lever being movable by lateral displacement of the belt on the rolls for closing the switch and completing the electric circuit to the solenoid whereby the regulating valve will be opened for admitting fluid to the jack cylinder and raising the piston rod, actuating rod, bracket and second roll for returning the belt to normal operative position, said switch being opened upon return of the belt to said normal operative position for breaking the circuit to the solenoid and permitting the valve to return to closed position and the cylinder to inoperative position.

5. In centering apparatus, a jack cylinder having a piston rod, an actuating rod connected with the piston rod, means mounting the actuating rod for sliding movement, means on the rod for limiting said rod in its sliding movement, a bracket on the rod, a sleeve pivotally connected with the bracket and receiving one end of a roll therein, a source of fluid pressure, a regulating valve connected between the source of fluid pressure and the jack cylinder, a source of current, electrically energizable means carried by the regulating valve for operating said valve, a switch having a lever engageable with a belt trained about the roll, and circuit connections between the current source, switch and said electrically energizable means, said switch being closed by movement of the lever upon engagement by the belt at lateral displacement thereof whereby the regulating valve will be opened for admitting fluid to the jack cylinder to shift the rods and one end of the roll upwardly for returning the belt to normal operating position.

6. In centering apparatus, rolls, one of said rolls being pivotally mounted at one end, a belt trained about the rolls, fluid operated means associated with the other end of said pivoted roll and having a piston operated by fluid pressure at displacement of the belt for shifting the pivoted roll and returning the belt to operative position, and electrically operated means for controlling fluid flow to said fluid operated means.

OSCAR J. NORTON.
WILLIE L. NORTON.